Aug. 2, 1966  C. BELSKY  3,264,031
INSIDE DOOR HANDLE AND ARMREST ASSEMBLY
Filed Aug. 7, 1964  2 Sheets-Sheet 1

CHARLES BELSKY
INVENTOR
BY *John R. Faulkner*
*John J. Roethel*
ATTORNEYS

Aug. 2, 1966  C. BELSKY  3,264,031
INSIDE DOOR HANDLE AND ARMREST ASSEMBLY
Filed Aug. 7, 1964  2 Sheets-Sheet 2

CHARLES BELSKY
INVENTOR

BY John A. Faulkner
John J. Roethel
ATTORNEYS

United States Patent Office 3,264,031
Patented August 2, 1966

---

3,264,031
INSIDE DOOR HANDLE AND ARMREST ASSEMBLY
Charles Belsky, Detroit, Mich., assignor to Ford Motor Company, Dearborn, Mich., a corporation of Delaware
Filed Aug. 7, 1964, Ser. No. 388,183
2 Claims. (Cl. 296—153)

This invention relates to an inside door handle and armrest assembly for vehicle doors.

The placement of the inside door handle and of the armrest on a vehicle door presents a number of problems to the vehicle designer. The inside door handle must be positioned so that effective leverage may be applied for operation of the latch mechanism to which it is coupled; it must be positioned so that it cannot be actuated by inadvertent contact; it must be positioned so that it does not interfere with the crank handle for operating a window raising and lowering mechanism; and it must be positioned so that if it is used as a door pull it will not be subject to undue stress. The restrictions on the placement of the armrest are even more limited. The armrest must be vertically positioned relative to the vehicle seat so that it will provide arm support for an average occupant of the seat; and the armrest must be longitudinally positioned on the door and of sufficient length so that it will provide arm support for the seat occupant regardless of the position of the seat in a fore and aft direction.

Frequently it is found that the ideal location for the door handle and the armrest is in the same general area or in functionally overlapping areas on the door panel. Accordingly, the current trend in the styling of automotive interiors is to position the inside door handle within the confines of a portion of the armrest without the two being otherwise structurally integrated. In this arrangement a portion of the armrest structure may overlap a considerable portion of the handle with only the hand grip portion of the handle exposed, as it must necessarily be to permit actuation of the latch mechanism to which it is coupled. One disadvantage of such an arrangement is that it is necessary to remove the armrest before the door handle can be removed to permit removal of the vehicle door panel for repairs to the mechanism within the door structure. Conversely, the replacement of the armrest on the door panel must follow the replacement of the door handle. Another disadvantage is that the lack of structural integration of the door handle and the armrest makes it somewhat difficult to align the two to provide proper door handle movement clearances during the initial installation of the door handle and armrest on the door panel.

The present invention seeks to eliminate these disadvantages by providing a unitized assembly of the handle and armrest in which the armrest shell provides a housing for and journals the actuating handle element. To remove the handle from the door panel for any reason, it is only necessary to remove the armrest and the door handle is automatically displaced. This permits a more streamlined appearance of the assembly since it may be designed as a complete unit rather than as two separate devices which must be interfitted with each other on the door panel. Another advantage of the integrated constructed is that the armrest provides a housing for a substantial portion of the handle. Since the armrest is covered with a resilient foam material, this provides a safety cushion around the handle protecting the vehicle occupant from injuries which might be caused during a collision by an unprotected projecting handle. Also, since a substantial portion of the handle is housed within the armrest shell, this minimizes likelihood that the latch mechanism can be actuated by inadvertent contact with the handle.

Other objects and advantages of this invention will become more apparent as this description proceeds, particularly when considered in connection with the accompanying drawings in which.

Figure 1:
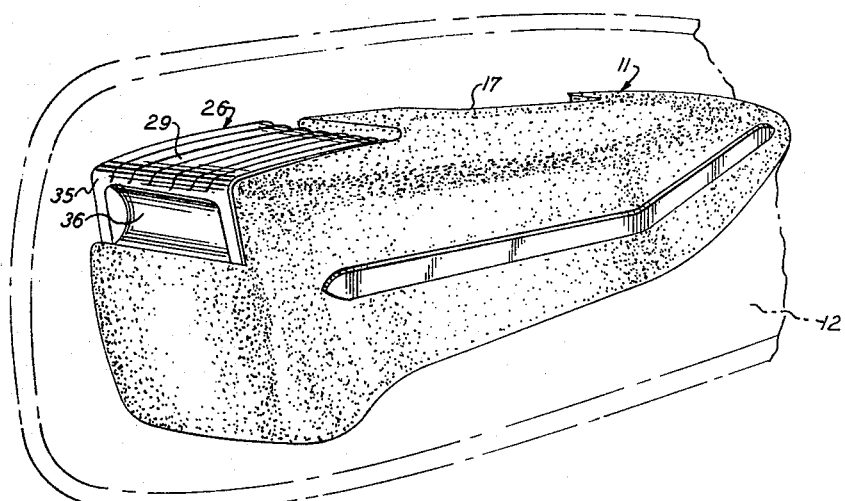
FIG. 1 is a perspective view of a door handle and armrest assembly embodying the present invention.
Figure 2:
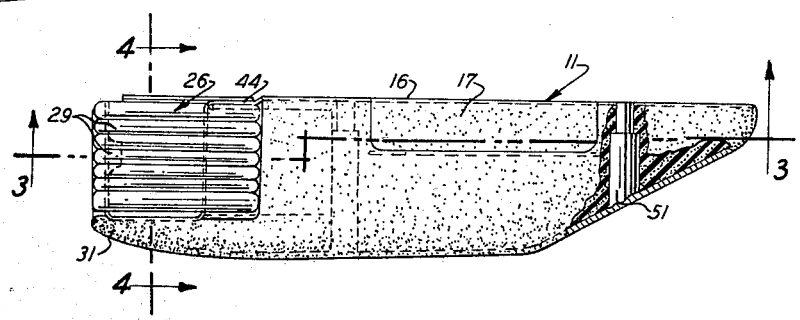
FIG. 2 is a plan view thereof.
Figure 3:
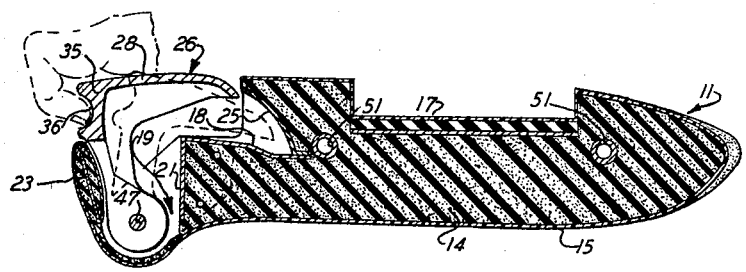
Figure 4:
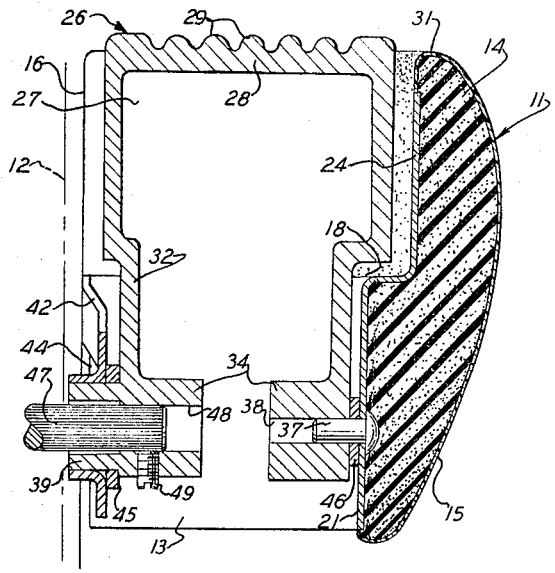
Figure 5:
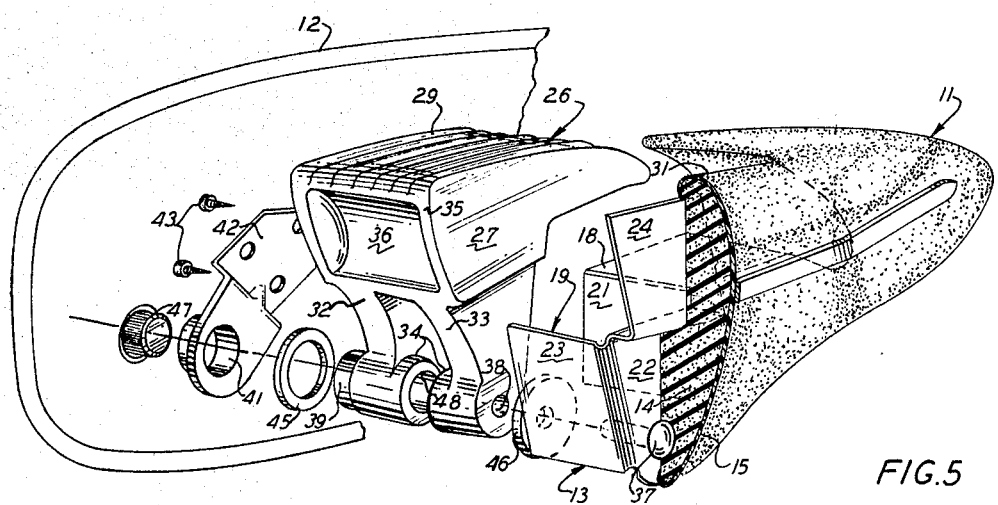

FIGS. 3 and 4 are sectional views taken through the lines 3—3 and 4—4 of FIG. 2, respectively; and FIG. 5 is an exploded perspective view, partially cut away, showing the component parts of the door handle and armrest assembly.

Referring more particularly to the drawings, there is shown an armrest, generally designated 11, adapted to be mounted on a vehicle door panel, a fragmentary portion 12 of which is shown.

The armrest 11 broadly follows conventional practice in that it comprises a sheet metal insert 13 covered by suitably contoured polyurethane foam rubber cushion 14 within a plastisol skin coat 15. Intermediate its ends and extending inwardly from its door panel abutting side 16, the armrest 11 is provided with a longitudinally extending door pull recess 17 adapted to receive a person's fingers. It is at the forward or left end, as viewed in the drawings, that the armrest assembly of the present invention departs from conventional practice.

The sheet metal insert 13 may be considered as having a horizontally extending platform portion 18. At its forward end, the platform portion 18 terminates in a plurality of flanges or sections forming a pocket 19. These flanges or sections comprise a laterally extending depending flange 21 at the forward edge of the platform portion 18; a longitudinally extending vertical flange 22 extending forwardly from the outboard edge of the flange 21; and a laterally extending, slightly angularly inclined, flange 23 turned from the forward edge of the flange 22 toward the door panel abutting side 16 of the armrest. The flange 22 has an upstanding offset extension 24. The front end structure or pocket 19 is completed by an arcuate shield 25 which is attached to the upper surface of the platform portion 18 at a point rearwardly of the crease line of the flange 21.

The purpose of the pocket 19 is to house and journal a latch mechanism operating lever, generally designated 26, for latch mechanism actuating movements.

The actuating lever 26 in its preferred form comprises a hollow die cast metal member having a body portion 27. The body portion has an upper wall 28 having a serrated outer surface 29 adaptive when in an inoperative position to lie in a substantially flush or a slightly raised relationship to the upper surface 31 of the armrest. The body portion 27 has a pair of depending leg portions 32 and 33 which, as best seen in FIG. 4, terminate in inwardly facing opposed hub portions 34. The upper front wall 35 of the body portion 27 has an inwardly extending finger receiving recess 36.

In assembled relationship, the depending leg portions 32-33 of the actuating lever 26 fit within the pocket 17 between the flanges 21 and 23 of the armrest insert 13. The body portion 27 of the actuating lever 26 is in alignment with the recess or pocket formed by the arcuate shield 25 and the platform portion 18 of the sheet metal insert 13.

The actuating lever 26 is journaled for swinging movement within the confines of the front end of the armrest as best seen in FIG. 3. The axis for swinging movement is provided in part by a pin 37 which extends through the flange 22 into a suitable aperture 38 in the leg portion 32 of the hub portion 34.

The leg portion 32 of the actuating lever body portion 27 has a hub portion 39 oppositely disposed to its hub portion 34. The hub portion 39 is journalled in an aperture 41 in one end of a bracket 42. Bracket 42 is adapted to be secured by sheet metal screws 43 (see FIG. 5) to a flange 44 which extends longitudinally of the sheet metal insert 13. Suitable washers 45 and 46 are provided as required to properly space the actuating lever between the wall or flange 19 and the bracket 42.

The armrest assembly as described comprises an integral assembly ready for mounting on the door panel and on the shaft or stem 47 of a conventional latch mechanism remote control device. As in any conventional installation, the stem 47 projects outwardly of the door panel. The stem is provided with a serrated surface and the aperture 48 in the actuating lever 26 is provided with complementary serrations to ensure a driving connection between the actuating lever and the latch mechanism stem 47.

If desired, a set screw 49 may be added to further ensure the coupling relationship between the actuating lever 26 and the stem 47.

With the actuating lever and the stem properly aligned, the armrest 11 is pushed against the trim panel on the inner surface of the vehicle door panel. Then suitable screws (not shown) are inserted into the screw receiving tubes 51 in the sheet metal insert 13 and the foam rubber covering the sheet metal insert. This is as is done in conventional practice, and when the screws 51 are tightened the armrest assembly including the actuating lever is ready for operation.

As shown in FIG. 3, during operation of the actuating lever 26, it swings rearwardly into the recess formed by the upper platform 18 and the arcuate shield 25. When released, it swings back to the upright position since either the latch mechanism or the remote control mechanism for actuating the latch mechanism is provided with a restoring means such as a spring.

It will be readliy apparent that the advantages derived from the type of construction disclosed are the unitized or integrated assembly of the handle and armrest, the protective insulation of the actuating lever and the improved appearance which may be achieved. The unitizing or integrating of the armrest with the actuating lever solves the problem of properly positioning the one with respect to the other on the door panel, thereby avoiding any undesirable interference of the armrest with the actuating lever when it is desired to open the vehicle door. The padding of the armrest surrounds the handle or actuating lever to improve safety and to prevent accidental unlatching of the door.

It will be understood that the invention is not to be limited to the exact construction shown and described, but that various changes and modifications may be made without departing from the spirit and scope of the invention, as defined in the appended claims.

I claim:

1. An armrest and latch mechanism assembly comprising:
   an armrest having a reinforcing and attaching insert covered by cushioning material,
   said insert having a platform portion terminating at one end in a plurality of flanges forming a pocket extending beneath the level of said platform portion,
   a shield portion secured to said platform portion on the upper surface thereof forming a recess extending longitudinally into said armrest from said pocket;
   a latch mechanism actuator,
   means within said pocket mounting said actuator for swinging movement in latch mechanism operating direction,
   said actuator being manually accessible at said one end of said armrest and upon being swung in latch mechanism operating direction having a portion retractable into said recess,
   and means on said actuator adapted to couple the latter to a latch mechanism operator upon said armrest being attached to a panel through which said operator projects.

2. In an armrest and latch mechanism actuator assembly:
   an armrest comprising a reinforcing and attaching member covered by cushion material;
   said member having a longitudinally extending platform,
   a pocket at one end of said platform defined by walls located below the level of said platform,
   and a shield portion projecting above said platform to define a recess opening toward said pocket;
   a latch mechanism actuator comprising a body portion having depending legs;
   and means journalling said legs within said pocket for swinging movement about an axis extending transversely of the longitudinal axis of said armrest,
   said body portion of said actuator being manually accessible at said one end of said armrest and upon being swung in latch mechanism operating direction having a portion retractable into said recess,
   and means on said actuator adapted to receive a latch mechanism operator upon said armrest being attached to a panel through which said operator projects.

References Cited by the Examiner

UNITED STATES PATENTS

| 2,276,020 | 3/1942 | Chlpka | 296—1 |
| 3,068,044 | 12/1962 | Wilfert | 296—44 |

FOREIGN PATENTS 1,338,407  8/1963  France.

References Cited by the Applicant

UNITED STATES PATENTS 2,038,062  4/1936  Simpson.

BENJAMIN HERSH, *Primary Examiner.*

P. GOODMAN, *Assistant Examiner.*